United States Patent [19]

Persson

[11] Patent Number: 4,693,422

[45] Date of Patent: Sep. 15, 1987

[54] DEVICE FOR FIRE FIGHTING

[75] Inventor: Karl-Gustav Persson, Gislaved, Sweden

[73] Assignee: IKO Kabel AB, Grimsas, Sweden

[21] Appl. No.: 912,665

[22] Filed: Sep. 29, 1986

Related U.S. Application Data

[63] Continuation of Ser. No. 692,962, Jan. 18, 1985, abandoned.

[30] Foreign Application Priority Data

Jan. 20, 1984 [SE] Sweden ............................... 8400270

[51] Int. Cl.$^4$ ........................ A62C 33/04; F16L 33/02

[52] U.S. Cl. ....................................... 239/195; 285/93; 285/197; 285/252

[58] Field of Search .................. 239/195, 197; 169/91, 169/51; 285/38, 93, 197, 199, 238, 242, 252, 260, 340; 24/20 S, 29, 271, 617, 652

[56] References Cited

U.S. PATENT DOCUMENTS

| | | | |
|---|---|---|---|
| 1,514,412 | 11/1924 | Wilkinson | 285/252 X |
| 1,543,558 | 6/1925 | Donald | 285/252 X |
| 4,489,464 | 12/1984 | Massari et al. | 285/252 X |
| 4,530,524 | 7/1985 | Stephens | 285/252 X |
| 4,572,552 | 2/1986 | Örevik | 24/20 S X |

FOREIGN PATENT DOCUMENTS

| | | | |
|---|---|---|---|
| 48778 | 3/1921 | Sweden | 285/252 |
| 1029965 | 7/1983 | U.S.S.R. | 169/51 |

*Primary Examiner*—Jeffrey V. Nase
*Attorney, Agent, or Firm*—John T. O'Halloran; Mary C. Werner

[57] ABSTRACT

The device concerns a waterhose wound around a bobbin, one end of the bobbin being provided with a quick-coupling having the form of a socket made of rubber or soft plastic connectable to water fittings of varying design.

9 Claims, 4 Drawing Figures

Fig. 2a
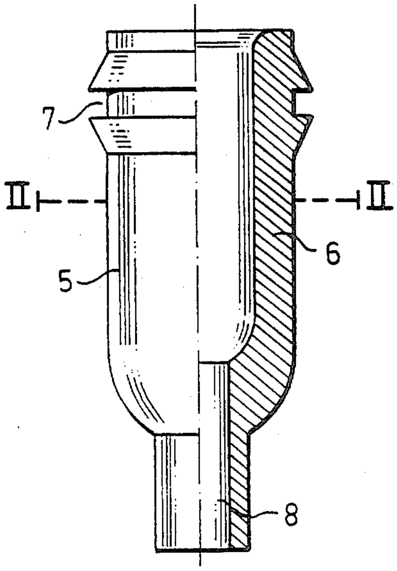
Fig. 3
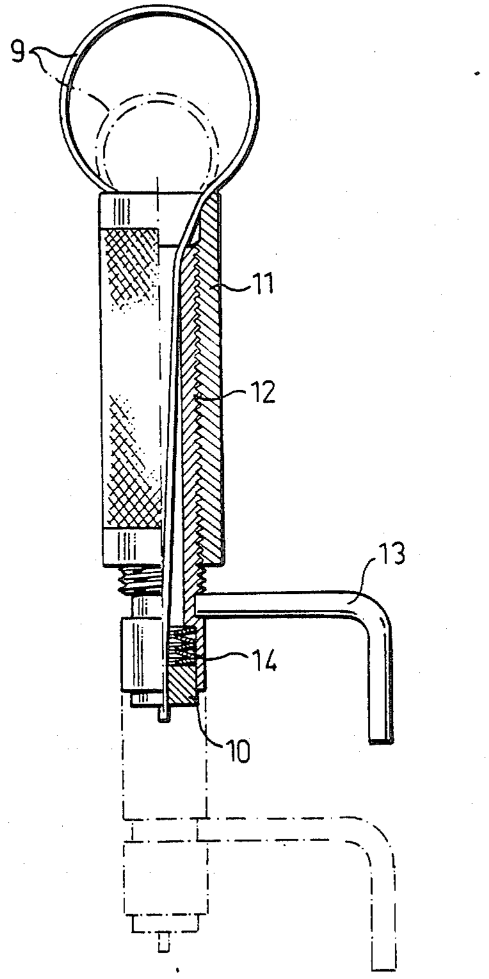
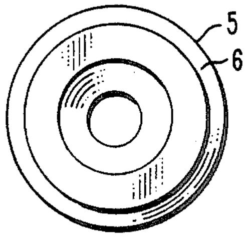
Fig. 2b

DEVICE FOR FIRE FIGHTING

This application is a continuation of application Ser. No. 692,962, filed Jan. 18, 1985, now abandoned.

BACKGROUND OF THE INVENTION

Subject invention concerns a device for fire fighting and more precisely a device which makes it possible to connect a water hose to water-points of different kinds.

When fighting smaller fires in homes and offices portable fire extinguishes containing powder or liquid are often used, which always must be loaded to be able to function. The big problem is then to supervise that they really are loaded and it is very common that they are useless when really needed.

According to experts the best means for fire fighting is water, but it is often difficult to bring water to the seat of fire. It is thus uncommon to have permanent stand pipes provided with a fire-hose in homes and offices and in addition the seat of fire may be so situated that the stand pipe cannot be reached.

It would therefore be an advantage to be able to use alternative water-points for fighting fires, but this has not been possible as the designs of the water-points vary very much. It has thus not been possible to connect one and the same water hose to the different water-points. It would not be possible to arrange one water hose at each water-point in a home for economical as well as aesthetic reasons.

SUMMARY OF THE INVENTION

The purpose of this invention is thus to obtain a fire-fighting device which works with water as the extinguishing means and which simply and quickly may be connected to all known water-points.

According to the invention this is obtained by help of the device.

BRIEF DESCRIPTION OF THE DRAWING

The invention is more closely described below with reference to the accompanying drawings in which:

FIG. 2A shows a partly sectional view of a quick coupling according to the invention;

FIG. 2B is a cross-sectional view taken along the line II—II of FIG. 2A; and

FIG. 3 is a partly sectional view of a locking device.

DETAILED DESCRIPTION OF A PREFERRED EMBODIMENT

Figure 1:
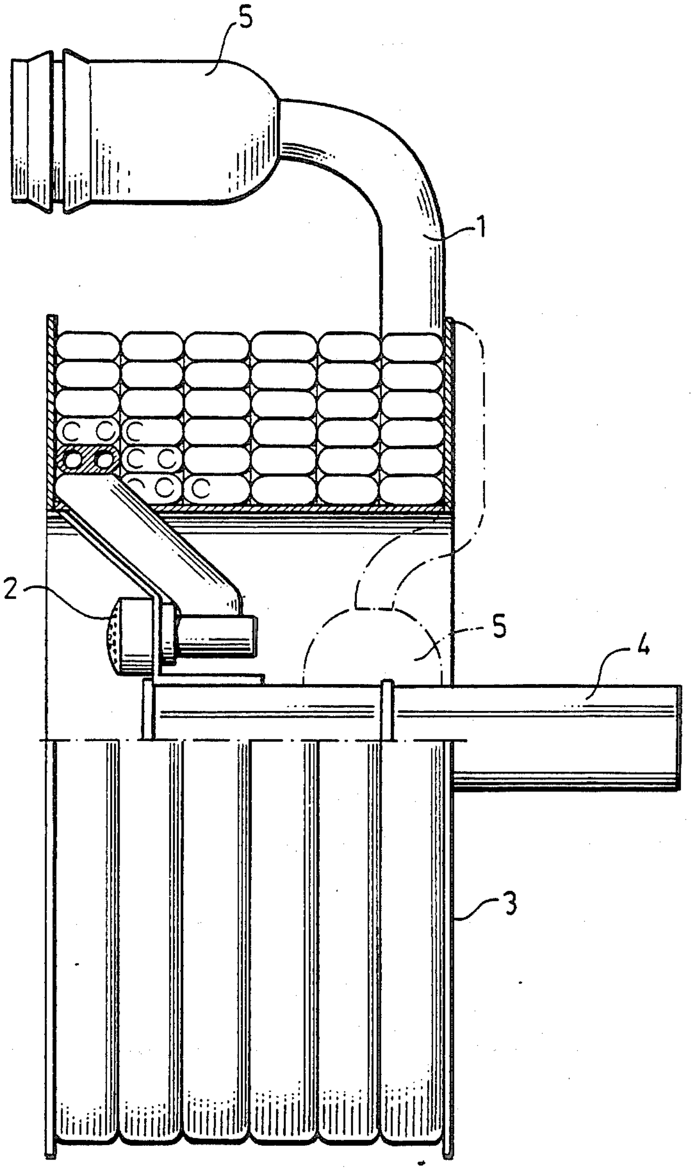
FIG. 1 shows a fire-fighting device according to the invention.

In the drawings 1 stands for a water hose having a nozzle 2 and being wound around a bobbin 3 with a handle 4. 5 stands for a quick-coupling, 6 and 7 its wall and a groove in the latter respectively and 8 a connection nipple. 9 stands for a snare having an end part 10, 11 and 12 are two hollow concentric screws, 13 a crank and 14 cup springs.

The fire-fighting device thus comprises a water hose 1 wound around a bobbin 3 which is easily portable between different water-points in a home or a working place. One end of the hose is provided with a conventional nozzle 2, while the other end is provided with a quick-coupling 5 to fit every known hydraulic fitting.

The coupling 5 is made of a thick-walled soft material such as rubber or plastics and has in its resting position such a dimension, that it may be forced over all known water fitting nozzles, whether they are round, oval, square, straight or angled. The nipple 8 has a dimension suitable for the hose.

The quick-coupling 5 is provided with a groove 7 on its periphery in which the snare 9 is accommodated and which is drawn when the coupling has been brought onto the fitting nozzle. The material in the coupling is then so soft and its wall so thick that the uniform pressure applied by a snare wound twice around the socket is insufficient to purse it up obtaining a good sealing.

To ensure that the device really works in the intended way during a fire, the connection of the coupling must be rapid and simple, which means that the drawing of the snare 9 must be almost instantaneous. According to a further development of the invention this is obtained by help of an operating means comprising two concentric, hollow screws 11, 12 movable relative to each other. The ends of the snare 9 are then brought through the inner screw 12 and united into a part 10, fixed at the end opposite the coupling.

When mounting, the coupling 5 is brought onto the fitting outlet a suitable distance, the snare 9 surrounding the socket and one end of the operating means abutting the socket. The end 10 of the snare 9 is fixed in the other end of the inner screw 12 as previously mentioned. By sliding the inner screw away from the socket, the snare will be drawn around the latter. The sliding movement is obtained for instance by help of a crank 13 on the inner screw 12, its threads having such a design that the screw is slid away from the socket when the crank is turned clockwise, which is the natural movement when a tightening is intended. By a suitable design of the pitch, the desired speed is obtained.

To ensure that the ends of the snare are not turned with the inner screw 12, gliding means may be arranged between the end of the screw and the attaching means of the snare. These gliding means may have the form of two cup springs 14, which exercise a certain opposition against the movement. This may also be utilized to give information about when the snare has been drawn sufficiently. According to a preferred embodiment, the outer part of the end 10 is situated a little outside the end of the screw 12 in its resting position. When a sufficient tractive force has been obtained, the pressure from the cup springs are overcome and the part 10 disappears into the screw.

If a fire starts the device according to the invention should be used in the following way. The whole device, including bobbin and hose with its nozzle and the quick-coupling is brought to the most suitable water-point. The quick-coupling, the socket, is brought onto the fitting outlet. The operator then uses one hand to hold the outer screw 11 on the operating means and the other hand to turn the crank until the inner screw 12 has been screwed so far out that the snare is sufficiently tightened. Then the water is turned on and the bobbin is carried towards the seat of fire during unwinding of the hose. It should be noticed that there is no need to unwind the entire hose if the seat of fire is close. Only a suitable length is unwound and water is poured even during the transport.

To secure that the unwinding is undisturbed a special hose may be used.

The nozzle 2 may preferably be provided with a closing device in case the pouring should not be started until the seat of fire is reached. The quick-coupling has such abilities that it can stand normal water pressure.

A specific advantage with the equipment is that it may be tested at intervals so that one can be sure of its functioning if a fire should start. This is not possible with common fire extinguishers as these normally must be loaded after every use.

I claim:

1. A device for fire fighting comprising:
a bobbin;
a water hose having two opposed ends and being positioned around said bobbin;
a nozzle at one of said ends; and
coupling means at the other of said ends, said means including:
a socket made of a thick walled, resilient material which is connectable to water points having varying configurations,
a first screw having a hollow interior;
a second screw having a hollow interior located in and being mutually slidable with said first screw,
a snare having end portions and being wound twice around said socket for clamping said socket on a water point, said end portions extending into said second screw and being axially fixed thereto, and
spring means located between said snare ends and said second screw to prevent turning of the snare when said second screw moves and to indicate when sufficient force has been applied to said snare.

2. The device according to claim 1 wherein said socket is provided with a groove around the periphery for accommodating said snare.

3. The device according to claim 2, wherein said socket is comprised of a soft armored material.

4. The device according to claim 1, wherein said first and second screws are provided with threads.

5. A device for fire fighting comprising:
a flexible tube having two opposed ends for transmitting fluid;

a nozzle at one of said ends;
a coupling joined to the other of said ends for fitting the tube onto a fluid source connection;
a flexible securing member wound around said coupling for holding said coupling on the fluid source connection, said securing member have two end portions;
operating means joined to said end portions of said securing member for tightening said securing member around said coupling, said operating means including an outer portion and an inner portion extending axially beyond one end of the outer portion when said operating means is in a resting position; and
gliding means positioned between the operating means and said end portions for exerting a predetermined amount of pressure therebetween in order to oppose turning movement of said end portions during the tightening operation and to cause said inner portion to recede into the one end of said outer portion when the predetermined amount of pressure is exceeded to indicate that a sufficient tractive force has been applied to said coupling.

6. The device according to claim 5, wherein said flexible securing member is a snare.

7. The device according to claim 6, wherein said coupling is provided with a groove extending around the periphery thereof for accommodating said snare.

8. The device according to claim 6, wherein said outer portion includes a screw having an opening therethrough and said inner portion includes an additional screw located in said opening and being slidable therein, said additional screw having a hollow interior for receiving said end portions of said snare, said operating means further comprising means connected to said additional screw for moving said inner screw.

9. The device according to claim 8, wherein said gliding means includes a spring.

* * * * *